US007125242B2

(12) United States Patent
Dewar (10) Patent No.: US 7,125,242 B2
(45) Date of Patent: Oct. 24, 2006

(54) DECOMPRESSION DEVICE FOR AN INJECTION MOLDING APPARATUS

(75) Inventor: Neil Dewar, Georgetown (CA)

(73) Assignee: Mold-Masters Limited, Georgetown (CA)

(*) Notice: Subject to any disclaimer, the term of this patent is extended or adjusted under 35 U.S.C. 154(b) by 136 days.

(21) Appl. No.: 10/637,576

(22) Filed: Aug. 11, 2003

(65) Prior Publication Data

US 2005/0035496 A1 Feb. 17, 2005

(51) Int. Cl.
B29B 11/06 (2006.01)
(52) U.S. Cl. ............ 425/542; 425/548; 425/549; 425/562; 425/563; 425/564; 425/565; 425/566
(58) Field of Classification Search ............ 425/542, 425/548, 549, 562–566
See application file for complete search history.

(56) References Cited

U.S. PATENT DOCUMENTS

| 2,514,390 | A |   | 7/1950 | Hagen |
|---|---|---|---|---|
| 2,928,125 | A |   | 3/1960 | Smucker et al. |
| 3,146,282 | A |   | 8/1964 | Ninneman |
| 3,205,911 | A |   | 9/1965 | Swick, Jr. |
| 3,270,115 | A |   | 8/1966 | Nouel |
| 3,315,899 | A |   | 4/1967 | Quarve |
| 3,902,665 | A |   | 9/1975 | Hendry |
| 3,934,626 | A |   | 1/1976 | Hall |
| 4,212,626 | A | * | 7/1980 | Gellert ............ 425/562 |
| 4,244,909 | A | * | 1/1981 | Gellert ............ 264/297.2 |
| 4,260,348 | A | * | 4/1981 | Graham ............ 425/144 |
| 4,400,341 | A |   | 8/1983 | Sorensen |
| 4,586,887 | A |   | 5/1986 | Gellert |
| 4,891,001 | A |   | 1/1990 | Gellert |
| 4,983,117 | A |   | 1/1991 | von Buren et al. |
| 5,011,646 | A |   | 4/1991 | Bertschi |
| 5,012,839 | A |   | 5/1991 | Rogers et al. |
| 5,049,343 | A |   | 9/1991 | Sorensen |
| 5,069,615 | A |   | 12/1991 | Schad et al. |
| 5,229,145 | A |   | 7/1993 | Brown et al. |
| 5,370,523 | A |   | 12/1994 | Kushnir |
| 5,458,843 | A |   | 10/1995 | Brown et al. |
| 5,460,510 | A |   | 10/1995 | Gellert |

(Continued)

FOREIGN PATENT DOCUMENTS

EP 0 293 756 A2 12/1988

(Continued)

OTHER PUBLICATIONS

Webster Online Dictionary Definitions of Sprue and Bushing.*

(Continued)

*Primary Examiner*—Joseph Del Sole
*Assistant Examiner*—G. Nagesh Rao
(74) *Attorney, Agent, or Firm*—Medler Ferro PLLC (57) ABSTRACT

A sprue bushing includes a melt channel for receiving a melt stream of moldable material from a source. The melt channel includes a first portion, a second portion and a decompression cavity located between the first portion and the second portion. A manifold having a manifold channel receives the melt stream from the melt channel of the sprue bushing and delivers the melt stream through the nozzle channels of several hot runner nozzles towards at least one mold cavity. A decompression device, which includes a rod having an enlarged head, is movable by an actuator to reciprocate within the decompression cavity between a retracted position and an extended position. Movement of the enlarged head from the extended position to the retracted position causes the suck back of the molten material in the hot runner nozzle and causes a portion of the molten material to be drawn toward the decompression cavity.

10 Claims, 6 Drawing Sheets

U.S. PATENT DOCUMENTS

| | | | |
|---|---|---|---|
| 5,464,579 A | 11/1995 | Brown et al. | |
| 5,720,433 A | 2/1998 | Forker | |
| 5,846,472 A | 12/1998 | Rozema et al. | |
| 5,910,327 A | 6/1999 | Schad et al. | |
| 5,968,562 A | 10/1999 | Schad et al. | |
| 5,975,127 A | 11/1999 | Dray | |
| 6,086,356 A | 7/2000 | Yu | |
| 6,135,757 A | 10/2000 | Jenko | |
| 6,264,459 B1* | 7/2001 | Voets | 425/548 |
| 6,348,171 B1* | 2/2002 | Dewar et al. | 264/297.2 |
| 6,454,558 B1 | 9/2002 | Gellert | |
| 6,575,731 B1 | 6/2003 | Olaru et al. | |
| 6,746,231 B1* | 6/2004 | Benenati | 425/547 |
| 6,780,003 B1* | 8/2004 | Sicilia et al. | 425/549 |
| 6,923,638 B1* | 8/2005 | Chen | 425/564 |

FOREIGN PATENT DOCUMENTS

| | | |
|---|---|---|
| EP | 0 293 756 A3 | 12/1988 |
| FR | 2 681 813 | 4/1993 |
| JP | 58051125 A | 3/1983 |
| JP | 60240425 | 11/1985 |
| JP | 5185473 | 7/1993 |
| JP | 6000848 | 1/1994 |
| JP | 06023805 | 2/1994 |
| JP | 06023806 | 2/1994 |
| JP | 10024453 | 1/1998 |
| JP | 20000025077 | 1/2000 |
| JP | 2000071288 | 3/2000 |
| JP | 2003127186 | 5/2003 |
| WO | WO 99/54109 | 10/1999 |
| WO | WO 03/084732 | 10/2003 |

OTHER PUBLICATIONS

Husky Product Literature, Design Guidelines, pp. 89-99, Jan. 2001.

Nachtsheim E: "Mit Etagenwerkzeugen Kostengünstiger Produzieren," Plastverarbeiter, Zechner Und Huethig Verlag GmbH. Speyer/Rhein, De, vol. 46, No. 6, pp. 50-52, 54, 56 XP000522417 Issn: 0032-1338 figure 8.

Markschläger G: "Etagenspritzgiesswerkzeuge Für Grossfchige, Komplexe Formteile. Ömultilevel Injection Moulds For Complex Mouldings With Large Surface Areas," Junststoffe, Carl Hanser Verlag. München, DE, vol. 83, No. 12, pp. 961-964 XP000414391, Issn: 0023-5563.

Li J et al: "Nadelverschlussdüsen als Alternative," Kunststoffe, Carl Hanser Verlag. München, DE, vol. 88, No. 6, pp. 792-794, 796 XP000766378 Issn: 0023-5563.

"Heisskanalsysteme für Etagenformen zum Spritzen von Verpackungsartikeln" English translation included: "Hot-channel systems for multi-stage moulds for the injection moulding of packaging articles," R. Friedrich, Apr. 28-29, 1998 (seminar).

* cited by examiner

DECOMPRESSION DEVICE FOR AN INJECTION MOLDING APPARATUS

FIELD OF THE INVENTION

The present invention relates generally to an injection molding apparatus and, in particular, to an actuated decompression device located in a sprue bushing for reducing the occurrence of drooling of a plurality of thermal gated hot runner nozzles.

BACKGROUND OF THE INVENTION

In an injection molding system, melt is delivered under pressure from a machine nozzle to a melt channel of a manifold through a sprue bushing. The melt is typically forced through the machine nozzle by an extruding screw. The melt is injected from the manifold into a multi-cavity mold via a plurality of hot runner nozzles. The nozzles include nozzles channels, which are in communication with the melt channel of the manifold.

When the melt flow from the machine nozzle is shut off following the injection of a shot, residual pressures remain in the melt channel of the manifold and the nozzle channels of the nozzles. This residual pressure is undesirable because it may prevent a clean tear between the molded part and the melt in the nozzle. Further, the residual pressure may result in melt drooling from the nozzles when the mold is opened. Drooling is a widespread problem in injection molding and may occur in one face molds, stack molds or tandem molds, for example.

"Suck-back" is a common technique for reducing the pressure in a melt stream following a shot. Suck-back involves creating of a space within the melt channel to artificially reverse the flow of melt for a short period of time. Suck-back is typically achieved by reversing the turning direction of the extruding screw, as described in U.S. Pat. No. 3,902,665 to Hendry, which is incorporated herein by reference.

In injection molding systems in which the machine nozzle must be retracted from the mold in order for the mold to be opened, such as stack mold systems, for example, decompression of the melt using suck-back from the machine nozzle is either not possible or it causes an increase in the cycle time because the suck-back step must be performed prior to the retraction of the machine nozzle.

An alternative attempt to combat the effects of residual pressure in the melt stream following a shot includes adding a decompression mechanism that operates independently from the machine nozzle. A decompression device that extends through a portion of the melt channel of the manifold is disclosed in U.S. Pat. No. 6,348,171 to Dewar et al. Such anti-drool mechanisms introduce flow restrictions into the system, which increase the difficulty of decompressing the melt stream. Further, adding such an anti-drool device to an existing system is prohibitively expensive, as the injection molding apparatus would need to be invasively retrofitted.

It is therefore an object of the present invention to provide a decompression device for an injection molding apparatus that may be added as a modular component to existing multi-cavity hot runner and stack mold systems.

SUMMARY OF THE INVENTION

According to an embodiment of the present invention there is provided an injection molding apparatus including:

a sprue bushing having a melt channel for receiving a melt stream of moldable material from a source, the melt channel having a first portion, a second portion and a decompression cavity provided between the first portion and the second portion;

a manifold having a manifold channel for receiving the melt stream from the melt channel of the sprue bushing and delivering the melt stream through a nozzle channel of a nozzle to a mold cavity;

a rod having an enlarged head, the rod being movable by an actuator to reciprocate within the decompression cavity between a retracted position and an extended position, the enlarged head of the rod being sized to restrict melt flow from the first portion of the melt channel to the decompression cavity when the enlarged head is in the retracted position;

wherein movement of the enlarged head from the extended position to the retracted position causes melt occupying the manifold channel and the nozzle channel to be drawn into the decompression cavity.

According to another embodiment of the present invention there is provided an injection molding apparatus including:

a sprue bushing having a melt channel for receiving a melt stream of moldable material from a source, the melt channel having a first portion, a second portion and a decompression cavity, the decompression cavity being located between the first portion and the second portion;

a manifold having a manifold channel for receiving the melt stream from the melt channel of the sprue bushing and delivering the melt stream through a nozzle channel of a nozzle to a mold gate;

a mold cavity selectively openable to receive the melt stream from the nozzle channel through the mold gate;

a rod having an enlarged head, the rod being actuable by a piston to reciprocate within the decompression cavity between a retracted position and an extended position, the enlarged head of the rod being sized to restrict melt flow between the first portion of the melt channel and the decompression cavity when the enlarged head is in the retracted position;

wherein movement of the enlarged head from the extended position to the retracted position causes melt at the mold gate to be drawn toward the decompression cavity.

According to another embodiment of the present invention there is provided an injection molding apparatus including:

a sprue bushing having a melt channel for receiving a melt stream of moldable material from a source, the melt channel having a first portion, a second portion and a decompression cavity provided between the first portion and the second portion;

a manifold having a manifold channel for receiving the melt stream from the melt channel of the sprue bushing and delivering the melt stream through a nozzle channel of a nozzle to a mold cavity;

a decompression device movable by an actuator to reciprocate within the decompression cavity between a retracted position and an extended position, the decompression device having an enlarged head coupled to a rod;

wherein movement of the enlarged head from the extended position to the retracted position causes melt occupying the manifold channel and the nozzle channel to be drawn toward the decompression cavity.

The present invention provides an advantage in that the decompression device is housed in the sprue bushing and as such may be added as a modular component to an existing injection molding apparatus without requiring an expensive and time-consuming retrofitting procedure. The present invention provides a further advantage in that in one embodiment, the decompression device is supported in an extended position.

BRIEF DESCRIPTION OF THE FIGURES

Embodiments of the present invention will now be described more fully with reference to the accompanying drawings in which like reference numerals indicate similar structure.

FIG. 3 is an isometric view of a portion of a rod with an enlarged head of FIG. 2a;

DETAILED DESCRIPTION OF THE INVENTION

Figure 1:
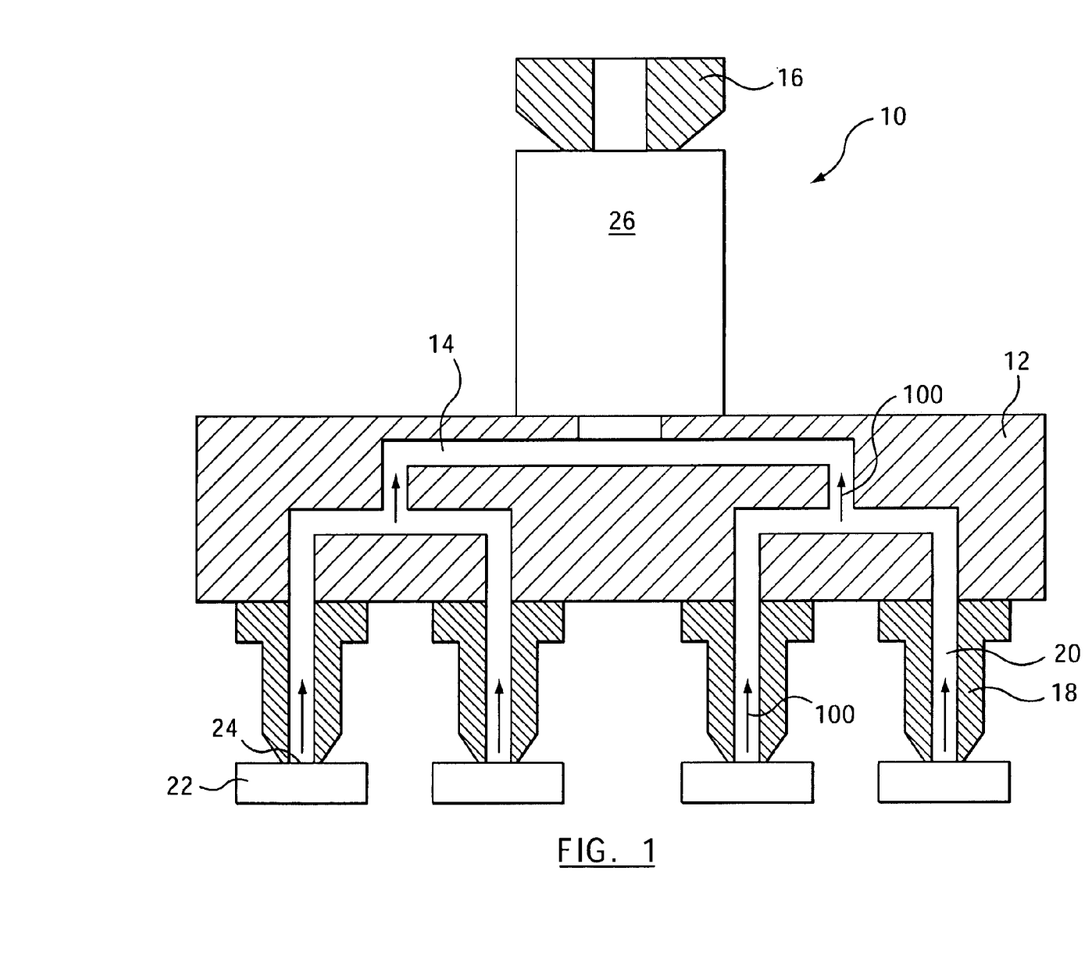
FIG. 1 is a side schematic view partly in section of an injection molding apparatus according to an embodiment of the present invention.

Referring now to FIG. 1, an injection molding apparatus is generally indicated by reference numeral 10. The injection molding apparatus 10 includes a manifold 12 having a manifold channel 14 for receiving a melt stream of moldable material from a machine nozzle 16 through a sprue bushing 26. A plurality of nozzles 18 having nozzle channels 20 are coupled to the manifold 12 for receiving melt therefrom and delivering melt to a plurality of mold cavities 22 through respective mold gates 24.

The manifold 12 and nozzles 18 are heated by heaters (not shown) and the mold cavities 22 are cooled by a suitable coolant, which flows through cooling channels (not shown).

Figure 2A:
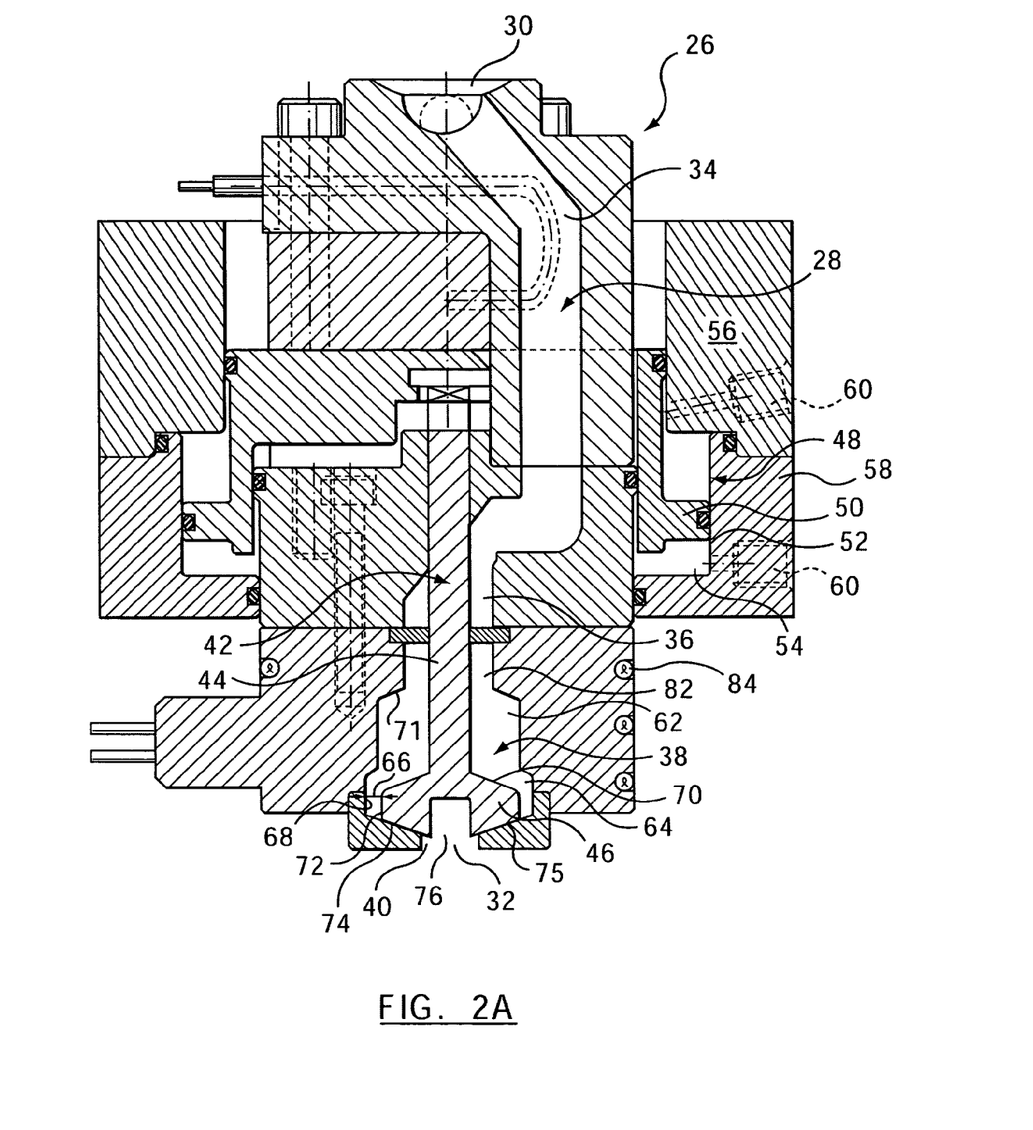
FIG. 2a is a side sectional view of portions of FIG. 1 in an extended position.
Figure 2B:
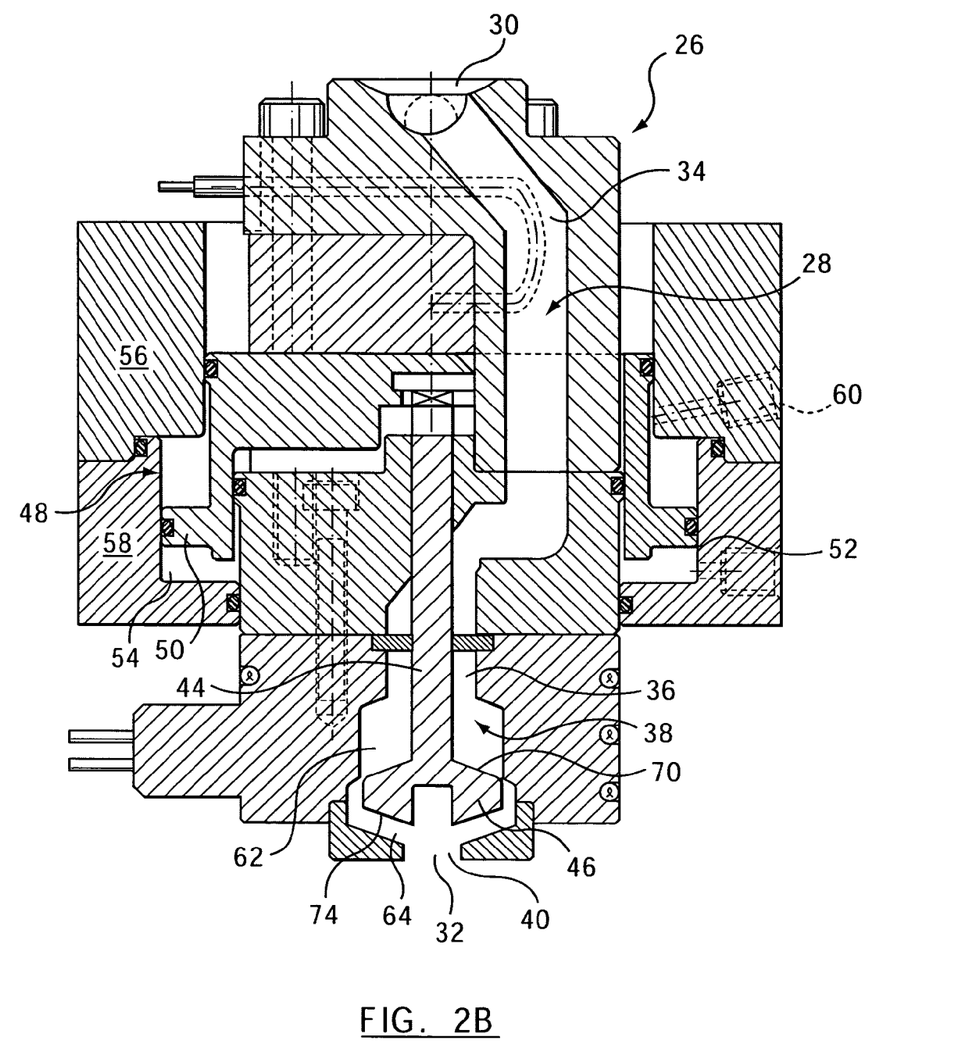
FIG. 2b is a side sectional view of FIG. 2a between an extended position and a retracted position.
Figure 2C:
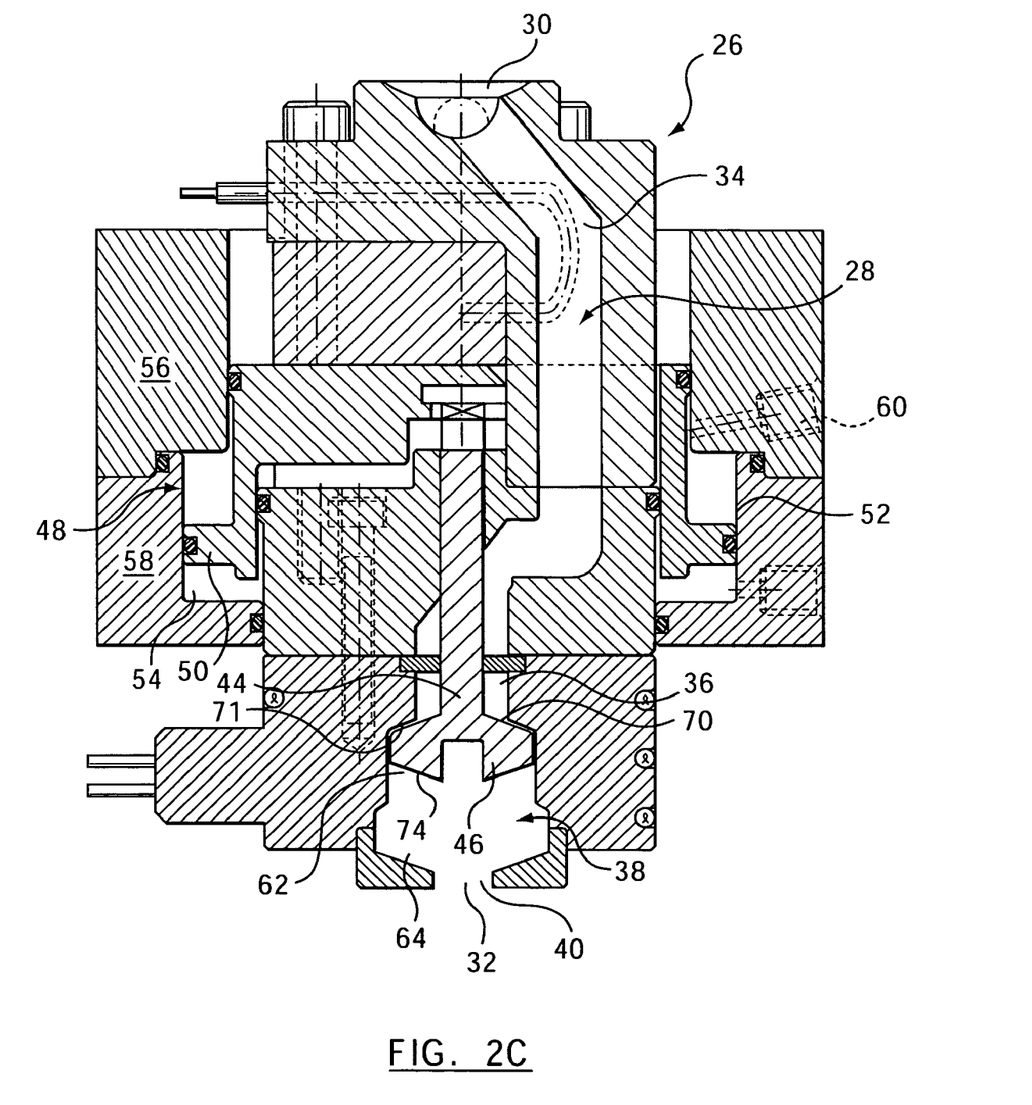
FIG. 2c is a side sectional view of FIG. 2a in a retracted position.

Referring now to FIGS. 2a to 2c, the sprue bushing 26 includes a melt channel 28 that extends between an inlet 30, which is coupled to the machine nozzle 16 to receive melt therefrom, and an outlet 32, which is coupled to the manifold channel 14 to deliver melt thereto. The melt channel 28 further includes an offset portion 34, a first portion 36, a decompression cavity 38 and a second portion 40, which extend between the inlet 30 and the outlet 32.

A decompression device 42 extends through the first portion 36 and the decompression cavity 38 of the melt channel 28. The decompression device is 42 generally a rod 44 having an enlarged head 46. The rod 44 is axially movable by an actuation mechanism 48. The actuation mechanism includes a piston 50 that is movable within a cylinder 52, which is generally a recess 54 provided in mold plates 56 and 58. Passages 60 are provided to allow for air to enter and exit the cylinder 52 in order to drive the piston 50. The piston 50 may alternatively be hydraulically driven. Further, the decompression device 42 may be axially reciprocated by another suitable actuation device.

The decompression cavity 38 includes an upper portion 62 and a lower portion 64. The upper portion 62 is sized to fit tightly around the enlarged head 46, while still allowing the enlarged head 46 to slide within the upper portion 62. The lower portion 64 is slightly larger that the upper portion 62 in order to provide a clearance 66 between an inner wall 68 of the decompression cavity 38 and the enlarged head 46 of the rod 44. The clearance 66 allows for melt to flow between the enlarged head 46 and the inner wall 68 of the lower portion 64 of the decompression cavity 38.

Figure 3:
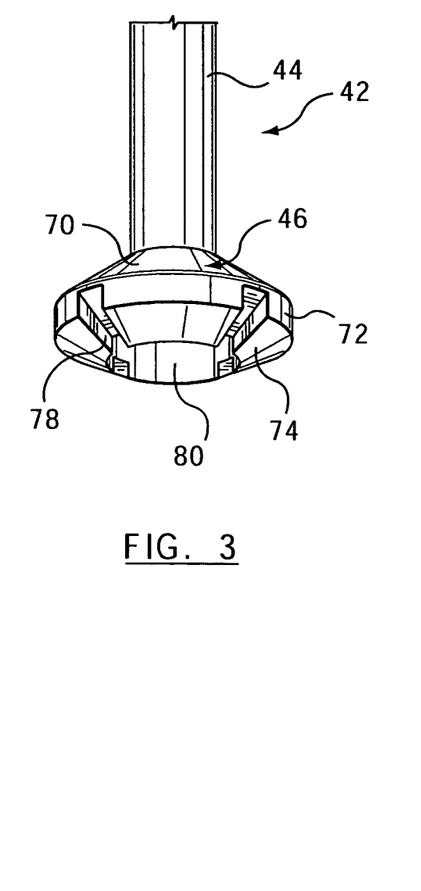

The enlarged head 46 of the rod 44 includes an upper surface 70, a generally cylindrical side wall 72 and a lower surface 74, as shown in FIG. 3. The lower surface 74 has a larger diameter than an inlet 76 of the second portion 40 of the melt channel 28. Four cutouts 78 are provided in the lower surface 74 of the enlarged head 46. The cutouts 78 are spaced about the lower surface 74 and meet at a central well 80, which is also provided in the lower surface 74.

When the decompression device 42 is in an extended, or melt delivery, position, which is shown in FIG. 2a, the lower surface 74 abuts a lower mating surface 75 of the lower portion 64 of the decompression cavity 38. In this position, the cutouts 78 allow for communication between the decompression cavity 38 and the second portion 40 of the melt channel 28 so that melt may flow continuously from the machine nozzle 16 through to the mold cavities 22.

The diameter of upper surface 70 is larger than an outlet 82 of the first portion 36 of the melt channel 28. As such, when the decompression device 42 is in a retracted position, which is shown in FIG. 2c, the upper surface 70 abuts an upper mating surface 71 of the upper portion 62 of the decompression cavity 38. In the retracted position, melt flow from the first portion 36 into the decompression cavity 38 is blocked.

The sprue bushing 26 further includes a heater 84 that communicates with a power source (not shown) through a connector 86.

Operation of the decompression device 42 will now be described with reference to FIGS. 2a to 2c. During injection, melt flows from the machine nozzle 16 into the melt channel 28 of the sprue bushing 26. The melt impacts the enlarged head 46 to force the decompression device 42 into the extended position of FIG. 2a.

Following injection of a shot, flow from the machine nozzle 16 is halted and the decompression device 42 is moved from the extended position of FIG. 2a to the retracted position of FIG. 2c by pneumatically driven piston 50. As the enlarged head 46 moves from the lower portion 64 of the decompression cavity 38 into the upper portion 62 thereof, melt located in the upper portion 62 is forced backward into the first portion 36 of the melt channel 28. This creates a low pressure volume in the decompression cavity 38. The low pressure volume causes melt that is located in the manifold channel 14 and nozzle channels 20 to be drawn backwards into the decompression cavity 38, as indicated by arrows 100 in FIG. 1. As such, melt is drawn away from the mold gates 24 and the occurrence of drooling from the nozzles 18 is reduced.

The decompression device 42 may also be used to reduce drooling from nozzles and from the faces of a movable melt transfer device in a stack injection molding apparatus or a tandem injection molding apparatus.

Figure 4:
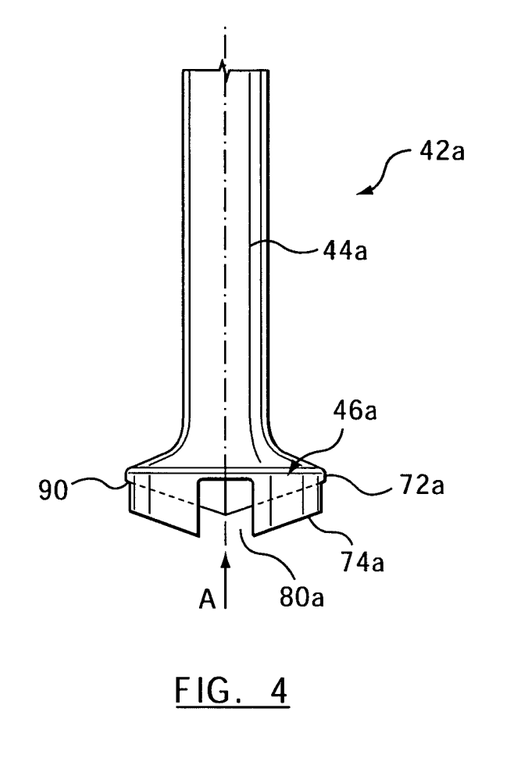
FIG. 4 is a side view of a portion of a rod with an enlarged head of another embodiment of the present invention.
Figure 5:
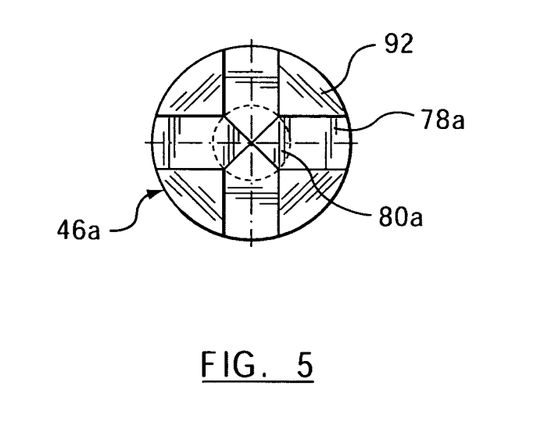
FIG. 5 is a view on A of FIG. 4.

Another embodiment of a decompression device 42a is shown in FIGS. 4 and 5. In this embodiment, enlarged head 46a of rod 44a includes a step 90 that is provided in generally cylindrical side wall 72a thereof. Cutouts 78a, which are provided in lower surface 74a, meet at central well 80a. The cutouts 74a are larger that the cutouts 78 of the previous embodiment such that only pie shaped portions 92 remain of the lower surface 74a. The step 90 facilitates the flow of melt through the cutouts 78a.

It will be appreciated that the size of the cutouts 78a and the central well 80a may be customized to suit any injection molding application.

Figure 6:
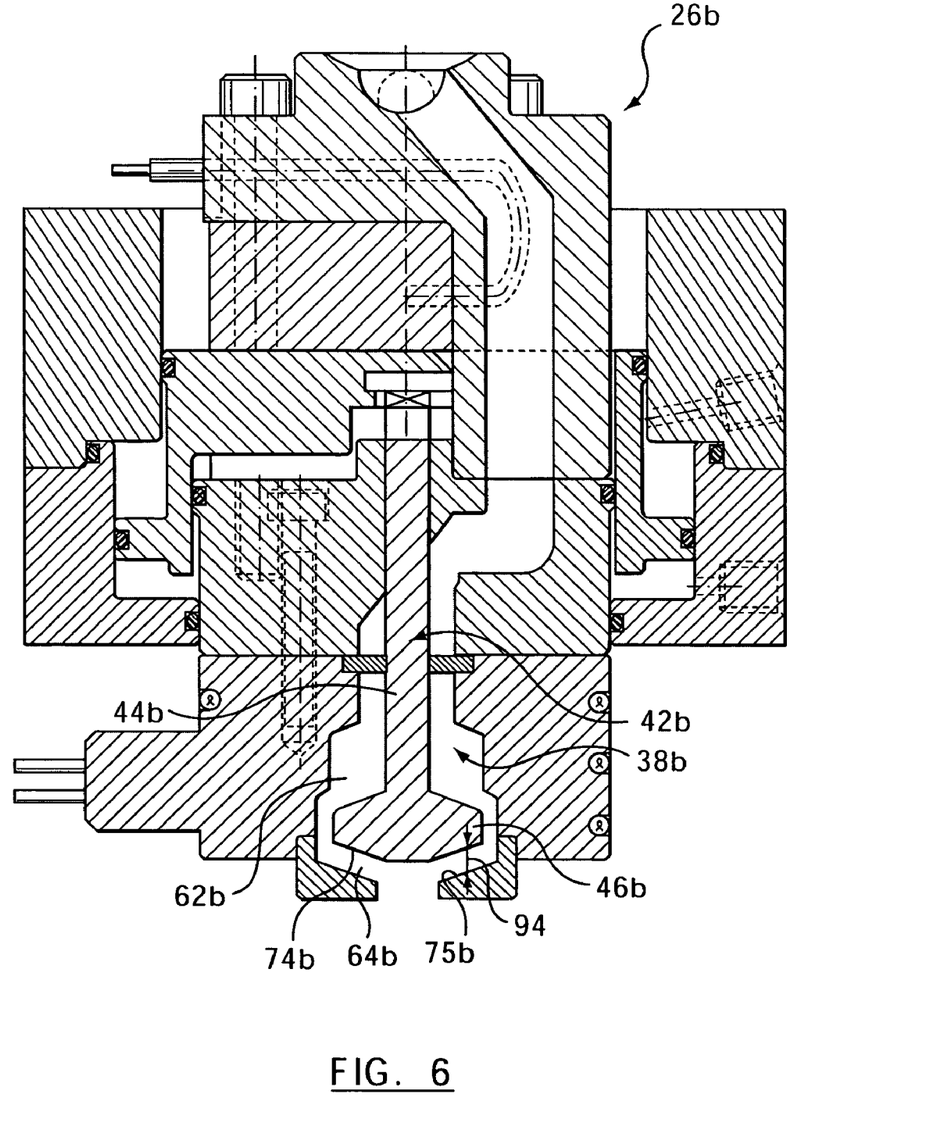
FIG. 6 is a side sectional view of another embodiment of the present invention.

In another embodiment, which is shown in FIG. 6, sprue bushing 26b includes a decompression device 42b that has a continuous lower surface 74b without any cutouts. In this embodiment, the rod 44b is sized to provide a gap 94 between lower mating surface 75b of the decompression cavity 38b and the enlarged head 46b when the decompression device 42b is in the extended, or melt delivery, position (shown in FIG. 6). Upper and lower portions 62b and 64b of decompression cavity 38b are sized as shown to allow for melt to flow around enlarged head 46b when the decompression device 42b is in the extended position. Operation of the decompression device 42b is similar to the operation of the previously described decompression device 42b embodiments, however, in the extended position, melt flows around the enlarged head 46b, through the gap 94, and into the second portion 40b.

In embodiments of FIGS. 2a–5, the decompression device 42a, 42b is supported in the extended position. In the embodiment of FIG. 6, the enlarged head 46b of the decompression device 42b does not abut the lower mating surface 75b in the extended position and is therefore unsupported. As such, the strength of the decompression device 42b must be sufficient to withstand the increased stress experienced in an unsupported extended position.

In each of the previously described embodiments, the melt channel 28 of the sprue bushing 26 is shown with an offset portion 34. It will be appreciate by a person skilled in the art that the melt channel 28 may instead be linear.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a sprue bushing having a melt channel for receiving a melt stream of moldable material from a source, said melt channel having a first upstream portion, a second downstream portion and a decompression cavity provided between said first upstream portion and said second downstream portion;
   a manifold having a manifold channel for receiving said melt stream from said melt channel of said sprue bushing and delivering said melt stream through a plurality of thermal gated nozzles; and
   a rod having an enlarged head with an outer diameter that is larger than an inner diameter of each of said first upstream portion and said second downstream portion of said sprue bushing melt channel, said enlarged head being movable within said decompression cavity between an extended position and a retracted position by an actuator, said enlarged head of said rod being sized to restrict melt flow from said first upstream portion of said melt channel to said decompression cavity when said enlarged head is in the retracted position,
   wherein movement of said enlarged head from the extended position to the retracted position causes a portion of the melt occupying said manifold channel to be drawn into said decompression cavity.

2. An injection molding apparatus comprising:
   a sprue bushing having a melt channel for receiving a melt stream of moldable material from a source, said melt channel having a decompression cavity located between a first portion of said melt channel upstream of the decompression chamber and a second portion of said melt channel downstream of the decompression chamber;
   a manifold having a manifold channel for receiving said melt stream from said melt channel of said sprue bushing and delivering said melt stream through a plurality of nozzle channels of a plurality of nozzles to at least one mold gate;
   a plurality of mold cavities selectively openable to receive said melt stream from said nozzle channels through said mold gate; and
   a rod having an enlarged head with an outer diameter that is larger than an inner diameter of each of said first and second portions of said spine bushing melt channel, said enlarged head being slidable within said decompression cavity between an extended position and a retracted position by a piston, said enlarged head of said rod being sized to restrict melt flow between said first portion of said melt channel and said decompression cavity when said enlarged head is in the retracted position,
   wherein movement of said enlarged head from the extended position to the retracted position causes melt at said mold gates to be sucked back and a portion of the melt from the manifold to be drawn toward said decompression cavity.

3. The injection molding apparatus as claimed in claim 2, wherein said piston is movable within a cylinder.

4. The injection molding apparatus as claimed in claim 1, wherein said decompression cavity includes an upper portion sized to receive said enlarged head and a lower portion sized to allow melt to flow around said enlarged head.

5. The injection molding apparatus as claimed in claim 4, wherein said enlarged bead of said rod includes an upstream surface, a generally cylindrical side wall and a downstream surface.

6. The injection molding apparatus as claimed in claim 5, wherein said upstream surface of said enlarged head blocks an outlet of said first portion of said spree bushing melt channel when said rod is in the retracted position.

7. The injection molding apparatus as claimed in claim 6, wherein at least one cutout is provided in said downstream surface of said enlarged head, said cutout for allowing melt to flow between said decompression cavity and said second portion of said melt channel when said enlarged head is in the extended position.

8. The injection molding apparatus as claimed in claim 6, wherein a plurality of cutouts are provided in said downstream surface of said enlarged head, said plurality of cutouts being spaced about said downstream surface and meeting at a central well provided in said downstream surface, said plurality of cutouts for allowing melt to flow between said decompression cavity and said second portion of said melt channel when said enlarged bead is in the extended position.

9. The injection molding apparatus as claimed in claim 8, wherein said upstream surface slopes in a generally downward direction.

10. The injection molding apparatus as claimed in claim 5, wherein the melt stream acting on said upstream surface of said enlarged head moves said rod from the retracted position to the extended position.

* * * * *

UNITED STATES PATENT AND TRADEMARK OFFICE
CERTIFICATE OF CORRECTION

PATENT NO.         : 7,125,242 B2                                                      Page 1 of 1
APPLICATION NO. : 10/637576
DATED              : October 24, 2006
INVENTOR(S)        : Neil Dewar It is certified that error appears in the above-identified patent and that said Letters Patent is hereby corrected as shown below:

In column 6, line 51 replace "spine" before "bushing" with -- sprue --.

In column 7, line 4 replace "bead" after "enlarged" with -- head --.

In column 7, line 9 replace "spree" before "bushing" with -- sprue --.

Signed and Sealed this

Thirteenth Day of February, 2007

JON W. DUDAS
*Director of the United States Patent and Trademark Office*